No. 797,509. PATENTED AUG. 15, 1905.
G. B. FRANK.
EAR STOPPLE.
APPLICATION FILED JUNE 11, 1904.

Witnesses
Milton Lenoir.
Ralph S. Warfield

Inventor
George B. Frank
by Vernon E. Hodges
Attorney

UNITED STATES PATENT OFFICE.

GEORGE B. FRANK, OF TOLEDO, OHIO, ASSIGNOR OF ONE-TENTH TO JAMES C. LEHMAN AND ONE-FOURTH TO FRANK B. ESTILL, OF TOLEDO, OHIO.

EAR-STOPPLE.

No. 797,509. Specification of Letters Patent. Patented Aug. 15, 1905.

Application filed June 11, 1904. Serial No. 212,162.

*To all whom it may concern:*

Be it known that I, GEORGE B. FRANK, a citizen of the United States, and a resident of Toledo, in the county of Lucas and State of Ohio, have invented a new and useful Improvement in Ear-Stopples, of which the following is a specification.

My invention relates to an improvement in ear-stopples.

The object is to provide a device for closing the auditory canal, especially during diving or bathing, for the purpose of keeping out the water, and particularly fine particles carried in suspension in the water, and salt water more than fresh water, which particles are liable to adhere to the wax of the ear and cause irritation, inflammation, abscesses of the ear, or other disturbances to the ear or Eustachian tube. Some ears are much more susceptible to this species of irritation than others. It is very common for surf-bathers and divers to insert cotton into the ear; but this practice is equally injurious and ofttimes results in the fine filaments of cotton getting into the wax and producing irritation.

It is the purpose of my invention to obviate these objections; and it comprises a rubber stopple having a cylindrical center portion which may be solid or hollow in the form of a dead-air space and having a flexible disk at each end, the whole being made of rubber, the inner disk serving to hold the stopple in the ear by engaging a slight enlargement in the auditory canal and the outer disk forming a flap which completely closes the canal against the entrance of extraneous substances by lying against the surface of the outer ear.

My invention further consists in certain novel features of construction and combinations of parts, which will be hereinafter described, and pointed out in the claims.

Figure 1:
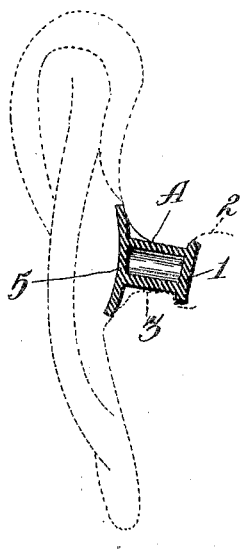
Figure 2:
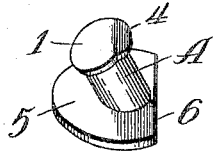
Figures 3, 4:
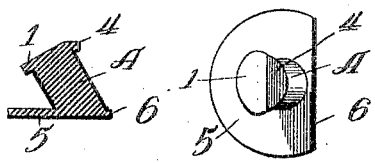
Figure 5:
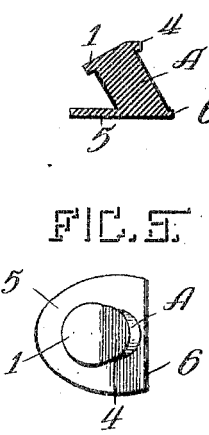

In the accompanying drawings, Figure 1 shows the stopple in section, dotted lines indicating the outer ear and ear-canal. Fig. 2 is a view in perspective of my improved stopple. Fig. 3 is a section through a slightly-modified form, and Figs. 4 and 5 are plan views of two slightly different forms of ear-stopple.

A represents the cylindrical center portion or shank of the stopple, which may be hollow, as shown in Fig. 1, or solid, if desired. When hollow it is entirely closed, inclosing a dead-air space, the purpose of this construction being to afford greater flexibility and pliability and to make the device just as light and thin as possible. At the inner end the fastening-disk 1 is formed, this being adapted to enter the enlarged portion 2 of the auditory canal or just behind the rigid or constricted outer end 3, its function being to hold the device in the ear. As shown in the drawings, one end of this disk is preferably extended off at a more or less slight angle to the remaining portion, as shown at 4, to make it conform more exactly to the recess and ridge which it is intended to fit. The outer disk is in the nature of a flap 5, the forward edge 6 of which may be perfectly or approximately straight and the remaining portion round or oval, as shown in Figs. 3 and 4, respectively, the latter being in that respect a slight modification simply in its oval or elliptical form instead of being round. This outer disk or flap constitutes a valve which lies gently against the surface of the outer ear, closing it against the entrance of water or anything carried in suspension in the water.

This improved stopple is very easily applied or removed, and its nature is such that it retains its position in the ear without accidental displacement or the slightest irritation. At the same time it is easily and quickly removed by simply taking an edge of the outer disk or flap between the thumb and forefinger and gently pulling it from the ear. When in place, it not only excludes foreign matter, preserving the normal and healthy condition of the ear, but also it does not objectionably interfere with the sound. It has the further function, when used in surf-bathing, of preventing the impact of the waves upon the ear-drum. Finally, it is the only ear-stopper, to my knowledge, which is held in place entirely from within the ear by the first and only curvature of the auditory canal, all others being fastened from the outside. Furthermore, the stem and the inner and outer disks all contribute to close the ear, each supplementing the other.

Slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. As an article of manufacture, an ear-stopple comprising a pair of disks and a compressible connecting-shank extending between and secured to the disks, one of the disks adapted to be received in an enlargement within the inner ear, the shank adapted to be received in the constricted portion of the auditory canal, and the remaining imperforate disk lying over and closing the outer end of the auditory canal.

2. As an article of manufacture, an ear-stopple comprising a central compressible portion and disks located at each end thereof and extending at an angle to each other, one disk adapted to be received within the inner ear, the remaining imperforate disk adapted to tightly close the outer end of the auditory canal, and the central portion of the stopple lying within the constricted portion of the auditory canal.

3. As an article of manufacture, an ear-stopple having a hollow compressible central portion and disks located at each end thereof, one of the disks adapted to be received within the inner ear and adapted to hold the stopple in position and the remaining disk adapted to tightly close the outer end of the auditory canal.

4. As an article of manufacture, an ear-stopple comprising a central shank, and a disk at each end, a portion of one disk extending at an obtuse angle to the other portion, the other disk being of larger size and straight at the forward edge and curved along its remaining portion.

5. As an article of manufacture, an ear-stopple comprising a central shank and disks at the opposite ends thereof, said disks being non-parallel and converging with respect to each other and the shank extending at an acute angle to one disk and at right angles to the other.

6. As an article of manufacture, a double ear-stopple consisting of a wholly-flexible member comprising a pair of disks and a connecting-shank between the disks, one of the disks adapted to lie within the enlargement of the inner ear and closing the auditory canal at that point, the other of the disks adapted to lie over and snugly closing the outer end of the auditory canal against the entrance of extraneous matter thereto.

In testimony whereof I have signed this specification in the presence of two subscribing witnesses.

GEORGE B. FRANK.

Witnesses:
F. E. NEWTON,
VERNON E. HODGES.